United States Patent Office 3,404,138
Patented Oct. 1, 1968

3,404,138
ANTISTATIC POLYVINYLCHLORIDE
COMPOSITION
Thomas John Adams, Bound Brook, N.J., assignor to
American Cyanamid Company, Stamford, Conn., a corporation of Maine
No Drawing. Filed Nov. 27, 1963, Ser. No. 326,344
8 Claims. (Cl. 260—92.8)

ABSTRACT OF THE DISCLOSURE

A polymeric composition comprising polyvinylchloride resin having dispersed therein from 0.2 to 5 weight percent of an amidopropyl trimethylammonium methosulfate to impart to the substrate improved antistatic properties and color stability when subjected to high temperature fabrication techniques.

---

This invention relates to the provision of polyvinylchloride plastic compositions having desirable antistatic properties. More particularly it relates to a method for preventing or minimizing the accumulation of surface electrostatic charges on polyvinylchloride compositions involving the incorporation therein of an amidopropyl trimethylammonium methosulfate represented by the Formula I:

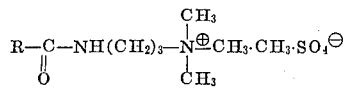

$$R-\underset{\underset{O}{\|}}{C}-NH(CH_2)_3-\underset{\underset{CH_3}{|}}{\overset{\overset{CH_3}{|}}{N^{\oplus}}}CH_3 \cdot CH_3 \cdot SO_4^{\ominus} \qquad I$$

wherein R is an alkyl group of 9 to 17 carbon atoms. Additionally this invention includes the particular polymeric composition resulting from this method.

An antistatic agent for internal use in (as opposed to external coating on) polyvinylchloride polymers (hereinafter called PVC), must fulfill certain special requirements beginning with sufficient activity to give adequate antistatic effect at practical concentration levels. The agent must also be of a nature such that it can be quickly and uniformly incorporated into PVC during the compounding of the latter, and, desirably, it should not impart color to the resin substrate, or cause the latter to decompose when subjected to high temperature conditions.

Various antistatic compounds have been proposed for use, including some which would expectedly foretell properties of the agents employed in this invention. United States Letters Patent Nos. 3,048,539, 2,891,878, 2,836,517, 2,626,877 and 2,626,876 are of interest in this connection. The fact is, however, that they do not, and, unfortunately, an agent satisfying all these requirements was not known prior to the present invention. There is a serious disadvantage in dispersing known antistatic agents throughout the plastic compositions before the latter are shaped by milling and/or molding. During processing under necessarily high temperatures, decomposition of the plastic (perhaps catalyzed by the antistatic agent) or of the antistatic agent itself may take place, resuling in undesirable darkening, or even complete discoloration of the milled PVC. In this condition, it is unsatisfactory for normal usage. An antistatic agent having this effect is, of course, not of interest for milling into PVC.

It is an object of the present invention to provide an antistatic agent for PVC, which agent minimizes the tendency of the PVC to accumulate electrostatic charges, but does not interfere with the heat-stability of PVC during high-temperature milling and molding operations necessary for converting the latter to shaped articles.

The present invention is based on the discovery that compounds of Formula I have excellent antistatic activity in PVC and yet when incorporated into a polyvinylchloride composition during compounding or processing steps, cause little or no decomposition or discoloration to take place, even under adverse conditions such as excessively high temperatures. A satisfactory polymeric material is obtained having useful antistatic characteristics.

It is surprising that the agents of this invention are as suitable as they are, when structurally related compounds result in PVC compositions which decompose and develop color during the compounding steps and are much less effective antistatic materials.

The agents of this invention can be blended into polyvinylchlorides by conventional procedures. Concentrations of about 0.2% to about 5.0%, with a preferred range being about 0.5% to about 2.0%, based on the weight of the polymer, are suitable. They can be used alone or with other additives such as antioxidants, ultraviolet light absorbers, pigments, extenders, plasticizers, etc.; in fact, it is an advantage of this invention that the antistatic agents, in being free-flowing, are easily blended with the polymer substrate during the milling operation required for blending the other additives which it may be desired to use. The agents of this invention may be used in various types of vinylchloride polymers, including homopolymers and copolymers with other monomers. They may be applied to both rigid polyvinylchloride and to plasticized polyvinylchloride compositions. Their use in rigid polyvinylchloride is particularly advantageous since such compositions have no plasticizer and are therefore subjected to higher processing temperatures.

A conventional way to evaluate antistatic effectiveness in the polyolefin composition, is to measure resistivity. This involves determining the resistance (in megohms) to a predetermined voltage applied to the surface of the polymer sample. Lower resistivity values indicate better antistatic properties.

Suitability of the agent with respect to heat stability, is determined by compounding the agent into the PVC and exposing the mixture to an accelerating-aging test. Discoloration upon aging indicates sample decomposition.

The following examples are presented to further illustrate the present invention.

EXAMPLE 1

Lauramidopropyl-trimethylammonium methosulfate

N-(3-dimethylaminopropyl)lauramide (206 g.) is dissolved in 200 cc. of acetone and 9.15 g. of dimethyl sulfate is added over a period of one hour to maintain reflux of the acetone. The mixture is heated for 30 minutes at reflux and cooled. An additional 250 cc. of acetone is added, and this mixture is heated to boiling, cooled and then filtered. The product is collected and, after drying at 25 mm. and 40° C., has a melting point of about 105–106° C.

This material is again recrystallized from acetone and treated with activated charcoal giving 189 g. of white crystals after drying under 255 mm. vacuum at room temperature for two days.

Other amidopropyl trimethylammonium methosulfates of Formula I are prepared by substitution of other amides in the foregoing procedure.

EXAMPLE 2

(1) Sample preparation

The antistatic agent of Example 1 and others for purposes of comparison are individually incorporated into PVC by milling on a two-roll laboratory mill at 175° C. at a 1.5% concentration for five minutes. The milled sheet is then compression-molded at 170°–175° C. under 24 tons pressure into plaques of 2 x 2½ x 0.05 inches.

(2) Resistivity measurements

All samples are conditioned for 24 hours at 70° F. and 50% relative humidity and surface resistivity measurements are made according to a modified ASTM D-257-58 test using a Tera-Ohmmeter (Rhode and Schwartz Company) at 900 volts.

Surface resistivity, expressed in megohms (instrument reading) is defined as the ratio of the direct voltage (900 volts) to the current on the surface of the polymer sample when the electrodes of the Tera-Ohmmeter are placed on opposite sides of the sample.

Low resistivity values indicate antistatic properties.

(3) Thermal stability measurements

The compression-molded samples of the polymer containing the various antistatic agents were tested for thermal stability by oven-aging in a forced draft oven at 175° C. The samples were removed at five-minutes intervals and examined visually for discoloration.

The results of these tests are shown in the following table.

persed therethrough from 0.2 to 5.0 weight percent of an amidopropyl trimethylammonium methosulfate of the formula:

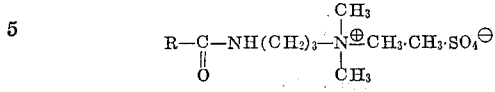

wherein R is an alkyl group of 9–17 carbon atoms.

2. The composition of claim 1 wherein R is undecyl.
3. The composition of claim 1 wherein R is tridecyl.
4. The composition of claim 1 wherein R is heptadecyl.
5. The method of improving the antistatic properties of polyvinylchloride which comprises, at elevated temperatures, homogeneously incorporating therein from 0.2 to 5.0 weight percent of an amidopropyl trimethylammonium methosulfate of the formula:

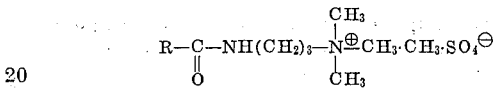

wherein R is an alkyl group of between 9–17 carbon atoms.

6. The method of claim 5 wherein R is undecyl.
7. The method of claim 5 wherein R is tridecyl.
8. The method of claim 5 wherein R is heptadecyl.

TABLE I

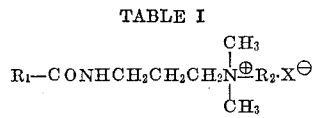

| Agent | $R_1$ | $R_2$ | X- Anion | Resistivity | Initial color | Color after 10 min., 175° |
|---|---|---|---|---|---|---|
| 1[1] | $C_{11}H_{23}$ | $CH_3$ | $CH_3SO_4^-$ | 55×10 | None | Yellow. |
| 2[1] | $C_{17}H_{35}$ | $CH_3$ | $CH_3SO_4^-$ | 17×10³ | do | Do. |
| 3[1] | $C_{13}H_{27}$ | $CH_3$ | $CH_3SO_4^-$ | 80×10 | do | Do. |
| A | $C_{17}H_{35}$ | 12 moles ethyleneoxide | Cl⁻ | 18×10 | Light yellow | Black. |
| B | $C_9H_{19}$ | Benzyl | Cl⁻ | 95×10 | Decomposed | |
| C | $C_{13}H_{27}$ | $CH_3$ | Cl⁻ | 66×10 | Yellow | Black. |
| D | $C_{17}H_{35}$ | 5 moles ethyleneoxide | $NO_3^-$ | 40×10² | Light yellow | Do. |
| E | $C_{13}H_{27}$ | (Acetylphenylonyl) $(-CH_2\overset{O}{\overset{\|}{C}})$ | Cl⁻ | | Light yellow | Do. |
| F | $C_{17}H_{35}$ | Hydroxyethyl | $NO_3^-$ | 30×10 | Very pale yellow | Do. |
| G | $C_{17}H_{35}$ | do | $H_2PO_4^-$ | 90×10³ | do | Do. |
| H | $C_{17}H_{35}$ | do | Oxalate | 19×12² | do | Do. |
| I | $C_7H_{35}$ | do | Cl⁻ | 13×10³ | do | Do. |

[1] This invention.

From these data it can be noted that only the agents of this invention satisfy the requirements for an excellent antistatic agent in PVC compositions. All other agents give PVC compositions which are not stable under high temperature processing conditions.

I claim:

1. A polymeric composition having improved antistatic properties comprising polyvinylchloride having dispersed therethrough

FOREIGN PATENTS 551,510   1/1958   Canada.
1,065,532   1/1954   France.

JOSEPH L. SCHOFER, *Primary Examiner.*

J. A. DONAHUE, *Assistant Examiner.*